(12) United States Patent
Ueberschlag et al.

(10) Patent No.: US 10,113,890 B2
(45) Date of Patent: Oct. 30, 2018

(54) MEASURING ARRANGEMENT HAVING A RAIL AND LINKAGE ASSEMBLY FOR MOUNTING AN ULTRASONIC FLOW MEASURING DEVICE IN A PIPE IN TILTED POSITION

(71) Applicant: Endress + Hauser Flowtec AG, Reinach (CH)

(72) Inventors: Pierre Ueberschlag, Saint-Louis (FR); Patrick Oudoire, Soultz (FR)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 15/104,025

(22) PCT Filed: Nov. 14, 2014

(86) PCT No.: PCT/EP2014/074657
§ 371 (c)(1),
(2) Date: Jun. 13, 2016

(87) PCT Pub. No.: WO2015/090772
PCT Pub. Date: Jun. 25, 2015

(65) Prior Publication Data
US 2016/0313158 A1    Oct. 27, 2016

(30) Foreign Application Priority Data
Dec. 20, 2013   (DE) .................. 10 2013 114 744

(51) Int. Cl.
G01F 1/66    (2006.01)
(52) U.S. Cl.
CPC .............. *G01F 1/662* (2013.01); *G01F 1/663* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 3,771,117 A | 11/1973 | Shaffer | |
| 5,368,413 A * | 11/1994 | Moore | F16L 1/10 405/184.5 |
| 5,574,263 A | 11/1996 | Roesner | |
| 6,047,602 A * | 4/2000 | Lynnworth | G01F 1/662 73/632 |

(Continued)

FOREIGN PATENT DOCUMENTS

| | | |
|---|---|---|
| DE | 2309605 | 9/1973 |
| DE | 9412457 U1 | 10/1995 |

(Continued)

OTHER PUBLICATIONS

German Search Report, German Patent Office, Munich, DE, dated Aug. 11, 2014.

(Continued)

Primary Examiner — Harshad R Patel
(74) Attorney, Agent, or Firm — Baco & Thomas, PLLC

(57) ABSTRACT

A measuring arrangement, comprising: a pipe with a pipe axis and an ultrasonic, flow measuring device. The ultrasonic, flow measuring device has a sensor unit, which is fixed in a hole in the pipe, which hole is introduced essentially perpendicularly to the pipe axis into the pipe wall. The sensor unit has a rail or a rod with a longitudinal axis. The rail or the rod bears at least two ultrasonic transducers, which define a signal path, wherein the signal path extends parallel to or on the longitudinal axis of the rail or of the rod, and wherein the signal path is tilted from a perpendicular connecting line between the center point of the hole and the pipe axis. In addition, an ultrasonic, flow measuring device is noted.

10 Claims, 5 Drawing Sheets

(56) References Cited

U.S. PATENT DOCUMENTS

| | | | |
|---|---|---|---|
| 6,345,539 B1 * | 2/2002 | Rawes | G01F 1/662 73/861.27 |
| 6,365,873 B1 * | 4/2002 | Smartt | B23K 31/125 219/130.01 |
| 7,870,793 B1 | 1/2011 | Feller | |
| 2001/0015107 A1 * | 8/2001 | Feller | G01F 1/662 73/861.27 |
| 2002/0021942 A1 * | 2/2002 | Willis | F16L 1/19 405/166 |
| 2016/0313158 A1 | 10/2016 | Ueberschlag | |

FOREIGN PATENT DOCUMENTS

| | | |
|---|---|---|
| DE | 19859572 A1 | 6/2000 |
| DE | 102006023479 A1 | 11/2007 |
| DE | 202008003584 U1 | 9/2009 |
| DE | 202012104552 U1 | 3/2013 |
| DE | 102013114744 A1 | 6/2015 |
| EP | 0394085 A1 | 10/1990 |
| EP | 0408148 A1 | 1/1991 |
| EP | 0477419 A1 | 4/1992 |
| FR | 2645901 A1 | 10/1990 |
| GB | 2294074 A | 4/1996 |
| JP | 814974 A | 1/1996 |

OTHER PUBLICATIONS

International Search Report, EPO, The Netherlands, dated Mar. 25, 2015.
English Translation of the International Preliminary Report on Patentability, WIPO, Geneva, CH, dated Jun. 30, 2016.

* cited by examiner

MEASURING ARRANGEMENT HAVING A RAIL AND LINKAGE ASSEMBLY FOR MOUNTING AN ULTRASONIC FLOW MEASURING DEVICE IN A PIPE IN TILTED POSITION

TECHNICAL FIELD

The present invention relates to a measuring arrangement and to an ultrasonic, flow measuring device.

BACKGROUND DISCUSSION

Known in the field of ultrasonic, flow measuring devices are clamp-on and in-line flow measuring devices. Both technologies have certain advantages and disadvantages.

Moreover, known from German patent, DE 20 2011 050 287 U1 are sensor elements, which have welded rods on the measuring tube and terminal, ultrasonic transducers. This construction is definitely to be associated with in-line measuring devices. In the case of in-line measuring devices, always a supplemental measuring tube is provided, which is inserted into an existing pipeline. Usually for this, a tube segment must be removed from the existing pipeline. By connecting flanges of the measuring tube with the pipeline ends, the in-line measuring device is then inserted into the pipeline.

In the case of in-line flow measuring devices, among other things, the connections to the pipeline must be appropriately sealed. Additionally, the material- and labor costs for installation of the device into a pipeline are comparatively high.

SUMMARY OF THE INVENTION

Starting from the previously known and distributed variants of ultrasonic, flow measuring devices, it is an object of the present invention to provide a measuring arrangement, in the case of which an ultrasonic flow measurement device can be integrated into a pipe of an existing pipeline.

According to the invention, a measuring arrangement includes a pipe with a pipe axis and an ultrasonic, flow measuring device, wherein the ultrasonic, flow measuring device has a sensor unit, which is fixed in a hole in the pipe, which hole is introduced essentially perpendicularly to the pipe axis into the pipe wall. The sensor unit has a rail with a longitudinal axis and the rail bears at least two ultrasonic transducers, which define a signal path. The signal path extends parallel to or on the longitudinal axis of the rail and wherein the signal path is tilted from a perpendicular connecting line between the center point of the hole and the pipe axis.

The present invention represents a compromise between a clamp-on measuring device and an in-line measuring device. It can, on the one hand, be fitted into an existing pipe of a pipe system, while, on the other hand, an engagement with the pipe wall must occur for installation and setting of the sensor element of the measuring device in the pipe.

In orienting the signal path, basically also an orienting of the ultrasonic transducer is possible. Since, however, a fine adjustment in the pipe is often very difficult for reasons of inaccessibility, the ultrasonic transducer can advantageously be connected fixedly with the rail and the rail tilted relative to the connecting axis.

It is advantageous to provide the sensor unit with a platform, which is connected securely with the pipe, wherein the platform is arranged outside of the pipe and wherein the rail extends from the platform into the interior of the pipe. Thus, the platform serves as a stop and limits the push-in motion. Naturally for this, the platform should have a greater dimension than the hole in the pipe or at least have projecting stop elements, while the rail and the ultrasonic transducer should be dimensioned smaller than the hole in the pipe.

The rail can for flexible orienting at different tilt angles in the measuring tube be connected with the platform via a joint. For a higher degree of freedom, the joint can especially advantageously be embodied as a ball joint.

The rail can advantageously be orientable by a linkage in the pipe. The linkage is operable, in such case, manually externally, thus outside of the pipe. The linkage is composed especially of two rod-shaped elements and two hinges. Thus, a translational movement in the case of actuating one of the elements of the linkage is advantageously converted into a swinging motion for orienting the rail.

Alternatively or supplementally, the pipe can have a nozzle with an angled segment portion, which is inserted into the hole. The angled segment portion has a central axis, which extends on or parallel to the longitudinal axis of the rail. In the case of this embodiment, the rail can be rigidly connected with the platform, since the nozzle guides the rail. In the case of a larger nozzle, a coarse orientation can occur and be fine-tuned by means of the linkage or a threaded collar.

For angled arrangement of the signal path in the pipe, alternatively or supplementally, a threaded ring can be provided. Angles can be set by a twisting motion of the threaded ring. For this, e.g. a Belleville spring can be utilized, which is supported unilaterally on a portion of the circumference of the hole.

According to the invention, an ultrasonic, flow measuring device includes a sensor unit, wherein the sensor unit has a rail with a longitudinal axis wherein the rail bears at least two ultrasonic transducers, which define a signal path, wherein the signal path extends parallel to or on the longitudinal axis of the rail, and wherein the ultrasonic measuring device has means for orienting the ultrasonic transducer within the measuring tube.

In the case of the variant of the invention for the ultrasonic flow measuring device, an orientation is enabled by the measuring device. Supplemental nozzles or threaded rings are not absolutely required. The device can, consequently, be pre-adjusted in the plant and delivered installation ready to the end customer.

The mentioned means can especially be embodied as a linkage.

BRIEF DESCRIPTION OF THE DRAWINGS

The invention will now be explained in greater detail based on examples of embodiments presented in the appended drawing, the figures of which show as follows.

DETAILED DISCUSSION IN CONJUNCTION WITH THE DRAWINGS

Ultrasonic, flow measuring devices are widely applied in process and automation technology. They permit in simple manner determination of volume flow and/or mass flow in a pipeline. Known ultrasonic, flow measuring devices work usually according to the travel-time difference principle. In the case of the travel-time difference principle, the different travel times of ultrasonic waves, especially ultrasonic pulses, so-called bursts, are evaluated relative to the flow direction of the liquid. For this, ultrasonic pulses are sent at a certain angle to the pipe axis both with as well as also counter to the flow. From the travel-time difference, the flow velocity can be determined and therewith in the case of known diameter of the pipeline section the volume flow.

The ultrasonic waves are produced, respectively received, with the assistance of so-called ultrasonic transducers. To this end, ultrasonic transducers are secured in a pipe wall in the relevant pipeline. There are also clamp on-ultrasonic, flow measuring systems. In the case of these systems, the ultrasonic transducers are pressed externally on a pipe wall. A great advantage of clamp-on ultrasonic, flow measuring systems is that they do not contact the measured medium and are placed on an already existing pipeline.

The ultrasonic transducers are normally composed of an electromechanical transducer element, e.g. a piezoelectric element, and a coupling layer. In the case of clamp-on systems, the ultrasonic waves are produced in the electromechanical transducer element as acoustic signals and led via the coupling layer to the pipe wall and from there into the liquid. In the case of in-line systems, the acoustic signals are in-coupled via the coupling layer into the measured medium. The coupling layer is also, not so frequently, referred to as a membrane.

Arranged between the piezoelectric element and the coupling layer can be another coupling layer, a so called adapting, or matching, layer. The adapting, or matching, layer performs, in such case, the function of transmission of the ultrasonic signal and simultaneously the reduction of a reflection at the interface between two materials caused by different acoustic impedances.

Both in the case of clamp-on systems, as well as also in the case of in-line systems, the ultrasonic transducers are arranged in a shared plane on the measuring tube, either on oppositely lying sides of the measuring tube, in which case the acoustic signal, projected on a pipe cross section, extends once along a secant through the measuring tube, or on the same side of the measuring tube, in which case the acoustic signal is reflected on the oppositely lying side of the measuring tube, whereby the acoustic signal travels two times through the measuring tube along the secant projected on the cross section through the measuring tube.

A preferred first example of an embodiment will now be explained based on FIGS. 1-4.

Figure 1:
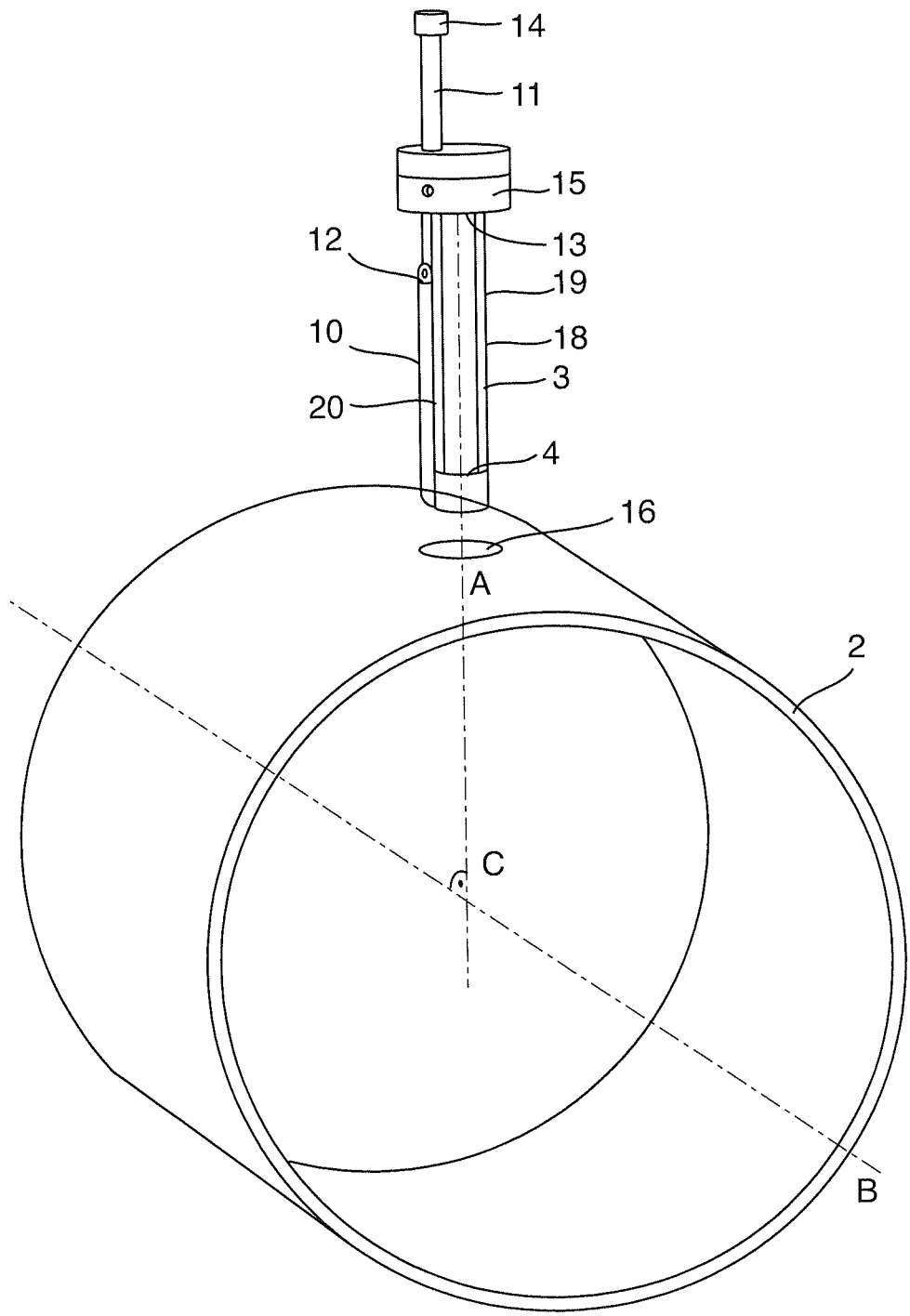
FIG. 1 is a perspective view of a part of a measuring arrangement of the invention composed of an ultrasonic flow measurement device and a pipe.

FIG. 1 shows a pipe 2 with a pipe axis B. A sensor unit 3 of a measuring device 1 is being inserted into the pipe 2. The sensor unit is composed of an elongated rail 18, which has a longitudinal axis A. Rail 18 includes two rail segments 19 and 20, which extend parallel to the longitudinal axis A. Arranged between the rail segments 19 and 20 is a space 21, which likewise extends along the longitudinal axis. The rail includes perpendicular to the longitudinal axis A elongated openings, through which a measured medium flowing in the pipe can penetrate into the space 21.

The rail need not absolutely have two rail segments, but, instead, can also be reduced to one rail segment. The terminology, rail, is to be understood correspondingly in the context of the present invention. Basically, the rail is present to provide a rod-shaped securement opportunity for two ultrasonic transducers.

Space 21 is limited terminally by two ultrasonic transducers 4 and 13, which are arranged in such a manner that they can transmit an ultrasonic signal along a signal path, which extends essentially on the longitudinal axis A or parallel to the longitudinal axis A of the rail. The ultrasonic transducers 4 and 13 are, in such case, rigidly connected with the rail 18. Therefore, in the case of an orienting of the rail, the separation and the angle of the two ultrasonic transducers relative to one another are held constant.

Pipe 2 includes a hole 16. Hole 16 has a hole center and a longitudinal axis C extending through the hole center. This longitudinal axis C, which is defined by the hole 16, is perpendicular to the pipe axis. Basically, the hole is a perpendicular bore into the pipe. Such bores, compared with inclined bores, are easy to form in a pipe, since the bore angle can be maintained very accurately.

The sensor unit 3 of the measuring device additionally includes a platform 15, which is arranged on an end of the rail 3. In a plane, which extends parallel to pipe axis B, platform 18 is dimensioned wider than the rail 18.

Arranged parallel to rail 18 in FIG. 1 is a linkage 5 having two rod-shaped elements 10, 11, which are connected with one another by means of a hinge 12. The hinge can in its simplest form be embodied as a connecting screw, such as shown in FIG. 1. Especially, the hinge 12 is embodied as a so-called pivot hinge. A first of the two rod-shaped elements 11 is additionally arranged in a hole in the platform 15 and is guided within this hole. While the rail 18 extends from an underside of the platform 15, a segment portion of the first of the two rod-shaped elements 11 protrudes from the upper side of the platform facing away from the underside. Arranged on this segment portion is a stop element 14.

Arranged within the platform 15 is a second joint 17. Joint 17 permits the rail 18 to be tilted relative to the platform 15. The joint 17 can be embodied, for example, as a ball joint.

The second of the two rod-shaped elements 10 is connected on one end via a second joint 9 with the rail 18, especially with the end of the rail 18.

Figure 2:
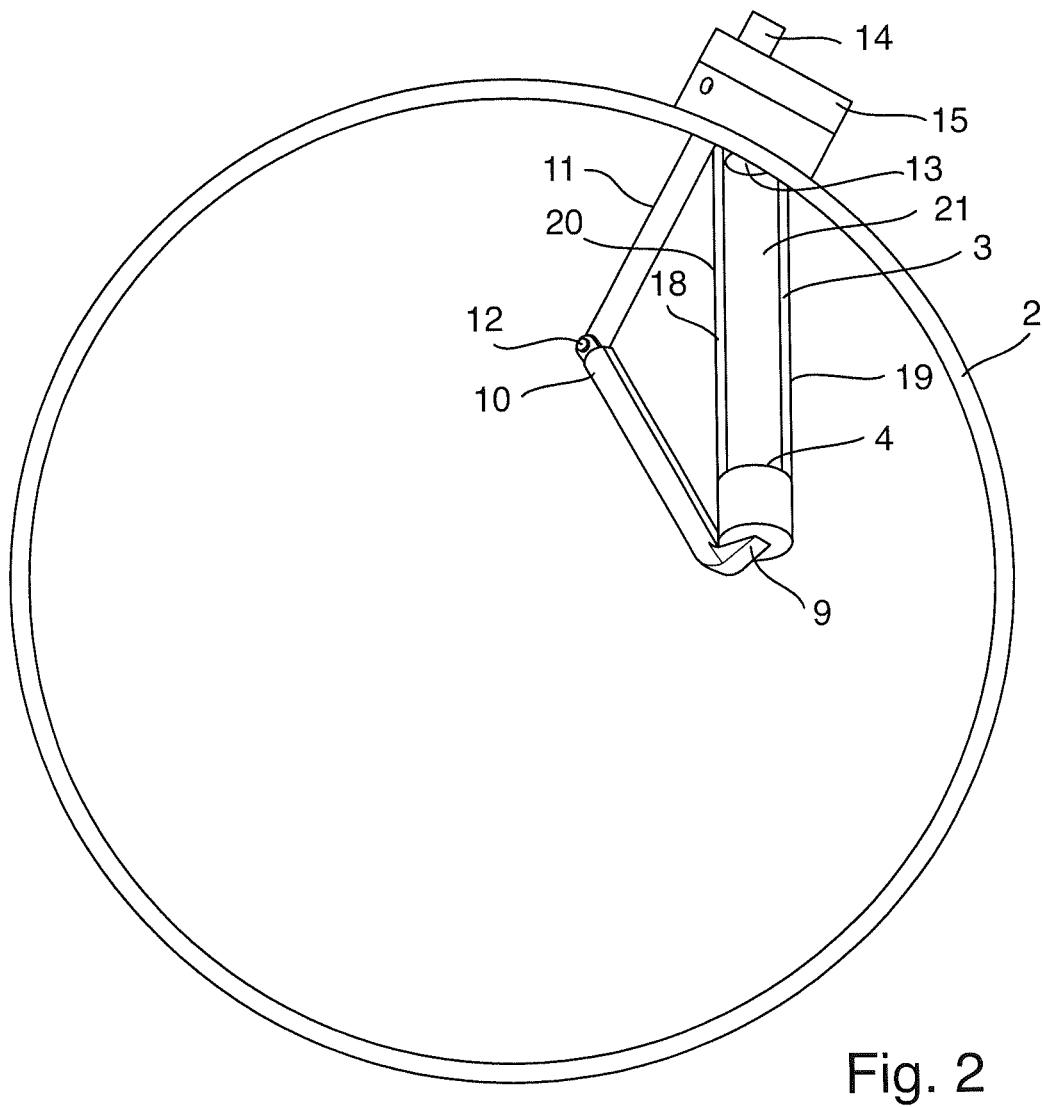
FIG. 2 is a sectional view of a part of the measuring arrangement.

FIGS. 1 and 2 show the installation and orientation of the sensor element 3 in the pipe 2. FIG. 1 shows the sensor element 3 with the rail 18 about to be pushed through the hole 16. The push-in motion stops, when the rail 18 protrudes completely or almost completely into the pipe 2. In this position, the platform 15 lies externally against the pipe 2. Of course, sealing elements can be arranged between the pipe wall and the platform 15. The push-in motion occurs, in such case, in a direction perpendicular to the pipe axis B. For securement, the hole can have a screw thread, in which a counterthread of the sensor unit, especially of the platform 15, engages.

In the case of perpendicular orientation, however, the sensor unit would understandably only difficultly be able to perform a flow measurement according to the travel time difference principle. Usually needed for this is an orientation of the signal path, such that an emitted ultrasonic signal travels at least partially in or counter to the flow direction.

This orienting is shown in greater detail in FIG. 2. Since the ultrasonic transducers 4 and 13 are connected fixedly with the rail, it suffices to tilt the rail relative to the platform 15, which is rigidly connected with the pipe wall of the pipe 2. The linkage 5 serves, in such case, for the orienting. Through translational movement of the first rod-shaped element 11 toward the pipe axis B, a bending of the hinge 12 occurs. In such case, the movement of the first rod-shaped element 11 is guided by the hole in the platform 15. By bending of the hinge 12, there occurs a transfer of the movement of the first rod-shaped element 11 to the second rod-shaped element 10. This, in turn, effects an opening of the hinge 9. As a result thereof, the rail 3 becomes tilted in the pipe 2 and thereby oriented. The extent of the translational movement of the first rod-shaped element determines the tilt angle of the rail 3 and, thus, the tilt angle of the sound path between the two ultrasonic transducers. The stop element 14 can be releasably arranged on the first rod-shaped element 11 and secured e.g. via a set screw. It limits the translational movement of the rod-shaped element 11 and, thus, determines the tilt angle of the sound path.

Figure 3:
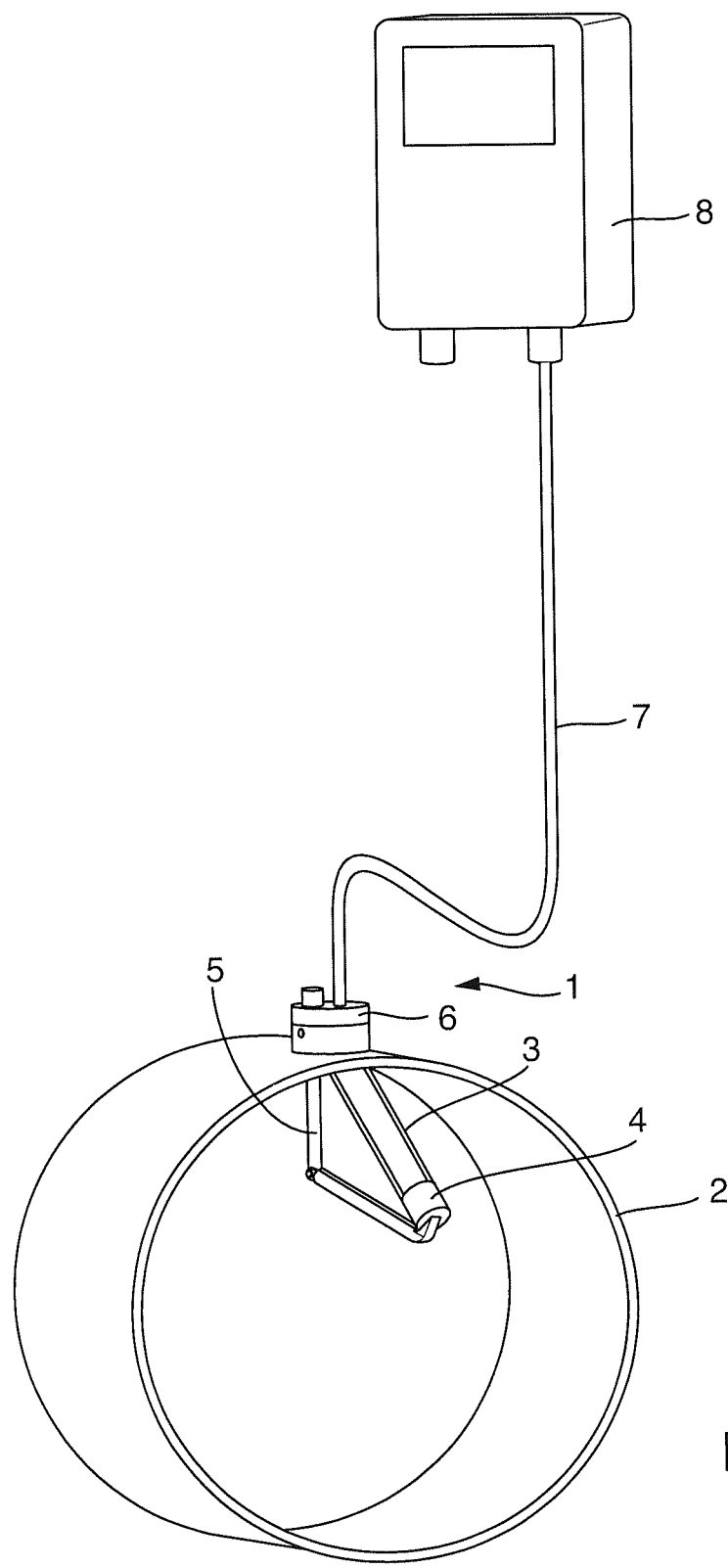
FIG. 3 is a perspective view of the measuring arrangement.

FIG. 3 shows an ultrasonic, flow measuring device 1 with the sensor unit 3. In addition to the measuring unit, the ultrasonic, flow measuring device 1 is completed by a display- and evaluation unit 8. A line 7 connects the two units with one another and enables the exchange of data and, in given cases, also the energy supply of the sensor unit. The data exchange can also occur wirelessly. The energy supply of the sensor unit can occur separately from the display- and evaluation unit 8.

The display- and evaluation unit 8 can also completely control the ultrasonic transducers.

The totality of pipe 2 and ultrasonic, flow measuring device 1 is understood to be a measuring arrangement in the context of invention.

Figure 4:
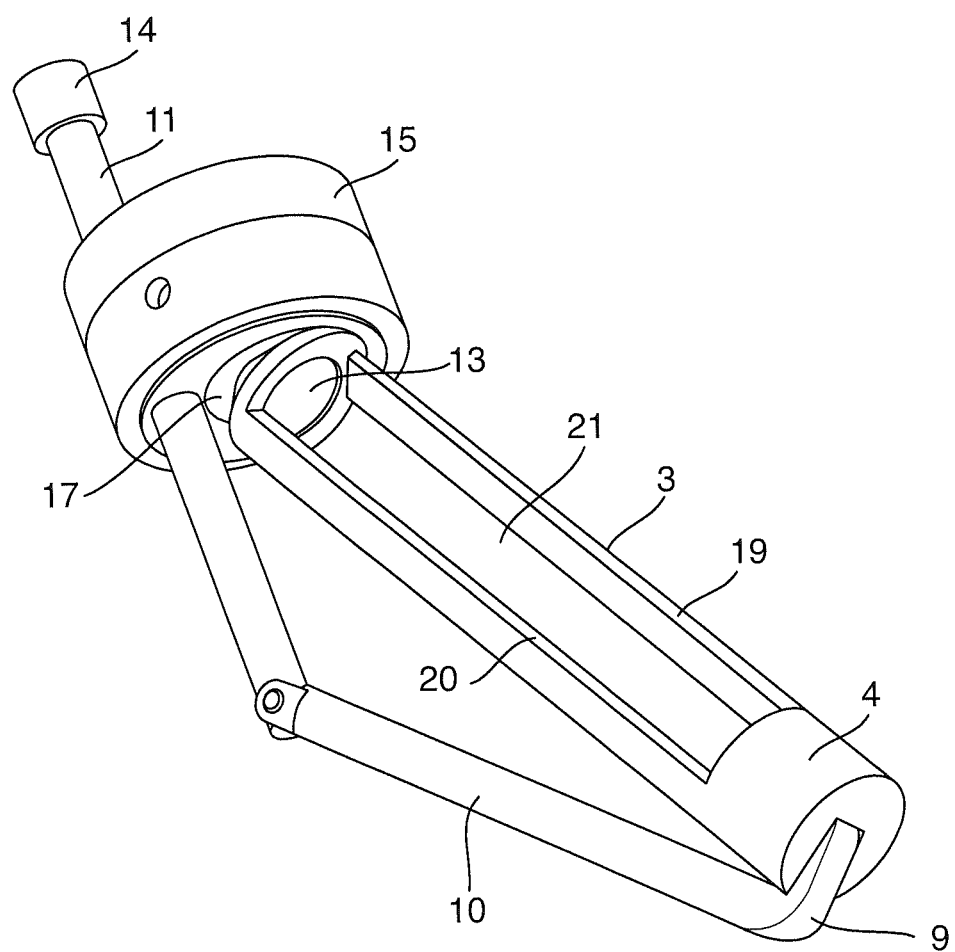
FIG. 4 is a perspective view of a sensor unit of the ultrasonic measuring device.
Figure 5:
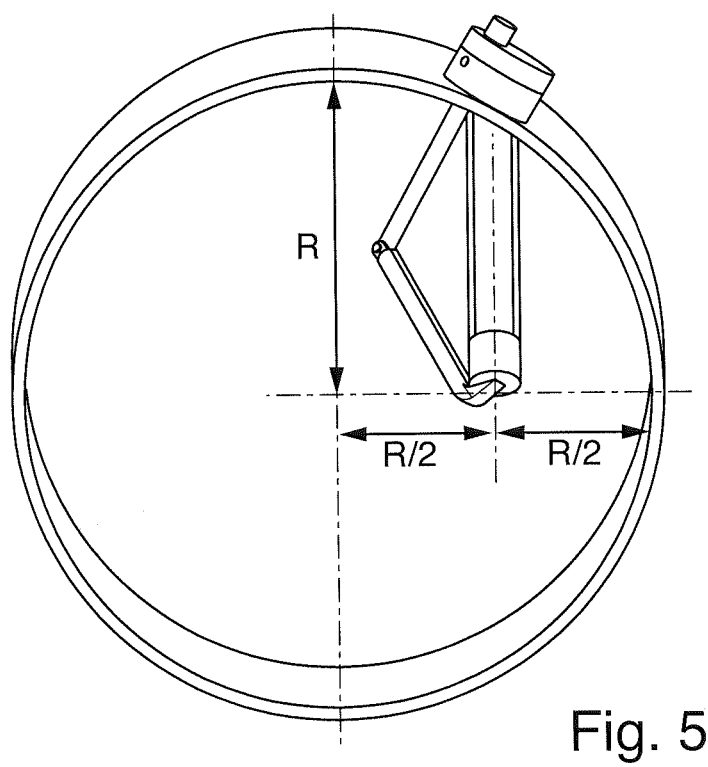
FIG. 5 is a view of an orientation of the sensor unit in the pipe.

FIG. 4 is a detail view of the sensor unit of FIGS. 1-3.

The rotational orientation of the platform about the axis C determines the tilt plane of the sensor unit 3. When this plane contains the pipe axis B, then the signal path axis A1, which in FIGS. 1-5 corresponds to the longitudinal axis A of the rail, follows the pipe axis B. Tilting of the sensor unit produces a measurement angle and defines a measuring path axis, which extends through the pipe axis B, respectively intersects with such. With this arrangement, a measurement error between a laminar flow profile and a turbulent flow profile is produced.

If the platform is rotated, then the tilt plane is defined, respectively produced, at an angle to the pipe axis. By this orientation, the tilting of the sensor unit produces a measurement angle and the measuring path is offset from the pipe axis. An especially optimal orientation results when the axis A of the rail 18 is a secant, which extends parallel to a pipe radius R and is spaced essentially by the distance of a half radius r/2 from such. This arrangement enables minimizing of the aforementioned measurement error between laminar and turbulent profiles.

In an embodiment (not shown), the ultrasonic transducers are mounted releasably on the rail and especially shiftably along the longitudinal axis A of the rail. In this way, the separation of the ultrasonic transducers can be varied relative to one another. This can occur, for example, by a screwed connection.

The orienting of the rail 18 via the linkage 5 is only one opportunity for performing the orientation. In an embodiment (not shown), the rail 18 can be connected with the platform 15 via a threaded ring. The orientation can, in such case, be achieved via the threaded ring, which makes the tilt angle of the rail adjustable. For this, the threaded ring can e.g. have a worm thread.

Alternatively, the orientation can also be achieved by means of a screw-in nozzle having an angled nozzle segment. The tilt angle of the nozzle segment gives the tilt angle of the rail.

The invention claimed is:

1. A measuring arrangement, comprising:
a pipe with a pipe axis and a pipe wall; and
an ultrasonic flow measuring device, wherein:
said ultrasonic flow measuring device has a sensor unit, which is fixed in a hole in said pipe, which hole is introduced essentially perpendicularly to said pipe axis into said pipe wall;
said sensor unit has a rail or a rod with a longitudinal axis;
said rail or said rod bears at least two ultrasonic transducers, defining a signal path;
said signal path extends parallel to or on the longitudinal axis of said rail or of said rod;
said signal path proceeds directly between said at least two ultrasonic transducers without reflections on said pipe wall;
said signal path is tilted from a perpendicular connecting line between a center point of said hole and said pipe axis after said rail or said rod is inserted into the pipe through the hole and maintaining the direct signal path between the at least two ultrasonic transducers; and
said rail or the rod is orientable in said pipe by a linkage.

2. The measuring arrangement as claimed in claim 1, wherein: said at least two ultrasonic transducers are connected fixedly with said rail or the rod and said rail or the rod is tilted relative to the connecting axis.

3. The measuring arrangement as claimed in claim 1, wherein:
said sensor unit has a platform, which is connected securely with said pipe;
said platform is arranged outside of said pipe; and
said rail or the rod extends from said platform into an interior of said pipe.

4. The measuring arrangement as claimed in claim 3, wherein:
said rail or the rod is connected with said platform via a joint.

5. The measuring arrangement as claimed in claim 4, wherein:
said joint is a ball joint.

6. The measuring arrangement as claimed in claim 3, wherein:
said sensor unit is embodied as a push-in part, which is insertable into said pipe until said platform contacts said pipe and which is releasably secured on said pipe.

7. The measuring arrangement as claimed in claim 1, wherein:
said linkage is composed of two rod-shaped elements and two hinges.

8. The measuring arrangement as claimed in claim 1, wherein:
by the tilting of said sensor unit, the axis of the measuring path is tilted from said pipe axis.

9. The measuring arrangement as claimed in claim 1, wherein:
the axis of said rail or rod forms a secant of the pipe cross section, which extends parallel to a pipe radius and essentially is spaced by a distance of a half radius r/2 therefrom.

10. An ultrasonic flow measuring device comprising;
a sensor unit, said sensor unit has a rail or a rod with a longitudinal axis; and
a measuring pipe with a pipe axis and a pipe wall, wherein:
said sensor unit is fixed in a hole in said measuring pipe;
said rail or said rod bears at least two ultrasonic transducers, defining a signal path;

said signal path extends parallel to or on the longitudinal axis of said rail or rod;
said signal path proceeds directly between said at least two ultrasonic transducers without reflections on said pipe wall;
said signal path is tilted from a perpendicular connecting line between a center point of said hole and said pipe axis after said rail or said rod is inserted into the pipe through the hole and maintaining the direct signal path between the at least two ultrasonic transducers; and
said rail or said rod is orientable in said pipe by a linkage.

* * * * *